United States Patent [19]

Hekal

[11] Patent Number: 5,062,569
[45] Date of Patent: Nov. 5, 1991

[54] PEELABLY SEALED PLASTIC PACKAGES AND METHOD OF PREPARING SAME

[76] Inventor: Ihal M. Hekal, 121 Blackberry Dr., Stamford, Conn. 06903

[21] Appl. No.: 226,490

[22] Filed: Aug. 1, 1988

[51] Int. Cl.$^5$ .............................................. B65D 1/34
[52] U.S. Cl. ................................. 229/3.5 R; 156/334; 206/484; 220/359; 229/125.35
[58] Field of Search ................ 524/451, 505; 206/484, 206/484.2, 574.1, 574.6; 220/359; 229/3.5 R, 123.1, 125.35; 156/334

[56] References Cited

U.S. PATENT DOCUMENTS

| | | | |
|---|---|---|---|
| 4,533,602 | 8/1985 | Nakamura et al. | 524/505 X |
| 4,689,099 | 8/1987 | Ito et al. | 229/125.35 X |
| 4,771,935 | 9/1988 | Hekal | 229/3.5 R |

Primary Examiner—Bryon P. Gehman

[57] ABSTRACT

A polypropylene container is disclosed which is hermetically sealed with a complementary lid extending across the open container the opposed faces of the container surface and the lid being bonded together by a peelable, heat seal layer intermediate between the opposed faces. The heat seal layer is comprised of a mixture of a particulate filler and an olefin polymer blend comprised of a homogeneous mixture of an olefin homopolymer, a highly crystalline propylene-ethylene block copolymer and an elastomeric ethylene-propylene copolymer.

18 Claims, 1 Drawing Sheet

PEELABLY SEALED PLASTIC PACKAGES AND METHOD OF PREPARING SAME

BACKGROUND OF THE INVENTION

1. Field of the Invention

This invention relates to a thermally processable plastic package for foodstuffs which are susceptible to oxidative deterioration and more particularly to such a package having a peelable, abuse resistant lid.

2. The Prior Art

In recent years the food packaging industry has shown intense interest in the concept of plastic container packed foods which among other advantages do not require freezing for their preservation and can therefore dispense with costly energy intensive refrigerated transportation and storage facilities. Much effort has gone into the development of a rigid or semi-rigid retortable or autoclavable plastic food container which in addition to withstanding the rigors of sterilization and later reheating and provide gas and moisture barrier properties which are sufficient to adequately protect the contents during storage, can also be effectively hermetically sealed with a lid which is readily peelable from the container without tearing or rupturing of the packaging materials. With respect to the peelable opening feature, as a simple matter of convenience, it is desirable that the food container be operable by manually pulling the lid from the container instead of relying on a knife, scissors, or tear tab to open the package.

Among the materials which have been investigated for use in the manufacture of the food container just described are laminated sheets of polyolefins such as polyethylene, polypropylene and copolymers thereof such as ethylene-propylene copolymers. The permeability of the laminated polyolefin sheets to gases is lowered by the incorporation in the laminated sheet structure of an inner layer of a gas barrier film such as a vinylidene chloride polymer (e.g. saran) or a hydrolyzed ethylene/vinyl acetate copolymer. Containers are manufactured from these laminated sheets, to which the desired shape is imparted, for example, by thermoforming. The container bodies generally possess a base and a sidewall which extends upwards from this base thus forming a type of tray or tub of cylindrical, truncated-cone, square, rectangular or even polygonal shape, depending on the nature of the article to be packaged.

The containers are hermetically sealed by means of a protective cover or lid. For this purpose, the sidewall of the container terminates at its upper end in a radially outwardly directed flat flange, the lid being Placed flat on the polyolefin flange surface and sealed under high pressure (e.g. 60 psi) and high temperature (e.g. 300° C.).

Hitherto, aluminum foils of at least 0.1 mil thickness or laminates consisting of such an aluminum foil and one or more thermoplastic films such as polyethylene or polypropylene have been used as lid materials. The aluminum foil surface to be heat sealed to the polyolefin flange is provided with a heat activatable bond promoting layer which allows the foil to be heat sealed to the flange. Adhesive coating layer compositions which have been studied for bonding the aluminum foil layer to the polyolefin flange include epoxy resins, ethylene-vinyl acetate copolymer and a carboxyl modified polypropylene such as the maleic anhydride adduct of an ethylene-propylene copolymer, one of which, Morprime (Morton Chemical, Division of Morton Norwich Products, Inc.) has been cleared for use in food packaging by the Federal Drug Administration and is commercially available.

Heat sealing of the adhesive coated aluminum foil lid to the polyolefin container flange is generally sufficient to ensure that the package remains hermetically sealed during normal handling and during transportation and storage.

Although heat sealing of the aluminum foil lid to the polyolefin container flange through the heat activatable bond promoting layer is highly effective for bonding the lid to the flange, it has been determined upon further experimentation, that the strength of the heat seal exceeds the tensile strength of the materials used for the fabrication of the lid so that when removal of the heat sealed lid is attempted, a portion of the lid adheres to the flange surface with the result that the surface of the flange in the heat seal area has an unaesthetic, rough and jagged appearance which is undesirable from the standpoint of consumer appeal. Further, because of the high strength bond, the force required to effect removal of the closure is too high for widespread consumer acceptance.

If it is attempted to weaken the heat seal to obtain a hermetically sealed container in which the lid can be readily opened, or peeled easily from the container flange, there results a seal of insufficient mechanical strength so that the package can be accidentally opened when dropped from a height or when subjected to abuse during normal handling and shipment.

It is therefore an object of the invention to provide a peelable, hermetically sealed thermally processable polyolefin plastic food container.

It is a further object of the present invention to provide a hermetically sealed polyolefin food container which can be peelably sealed and which can withstand accidental opening when dropped from a height or subjected to mechanical abuse during handling and transportation.

According to the present invention there is provided a method of manufacturing a polyolefin container and particularly a polypropylene container which can be hermetically sealed with a lid which can be peeled open, which method comprises interposing between the lid and the container surface to be sealed an intermediate layer comprising a mixture of a particulate filler and an olefin polymer blend comprised of a homogeneous mixture of an olefin homopolymer, a highly crystalline propylene-ethylene copolymer and a elastomeric ethylene-propylene copolymer.

The combination of particulate filler and olefin polymer blend produces an intermediate heat seal layer in which the cohesive strength of the intermediate layer is less than bond strength of the heat seal so that when it is attempted to separate the lid from the container, the cohesive failure of the intermediate layer permits the lid to be readily peeled away from the container surface to which it had been originally heat sealed.

In mechanical abuse tests, containers hermetically heat sealed in accordance with the method of the present invention and then retort processed were found to withstand accidental opening under conditions which satisfy United States Department of Agriculture (USDA) mechanical abuse specifications for food containers. The containers will also advantageously withstand accidental opening under low temperature conditions, i.e., temperatures of about 42° F. encountered under refrigeration conditions.

DETAILED DESCRIPTION OF THE INVENTION

In accordance with the present invention the container may be fabricated from one or more polyolefin materials or multilayer sheet structures made by lamination of the individual layers utilizing one of the prior art methods of coextrusion or by laminating together separately formed sheets of the individual polyolefin layers.

In such laminated structures the outer polyolefin layers may be from about 10 to about 60 mils thick and are preferably from about 15 to about 30 mils thick. By the term "polyolefin" as used herein is meant polyethylene, polypropylene and random copolymers of ethylene and/or propylene with less than 50% by weight of other olefinically unsaturated monomer or block copolymers of ethylene and propylene with less than 50% by weight of the other copolymer. Polypropylene is the preferred polyolefin material.

To prepare a food container having reduced permeation to gases, a layer of an extrudable gas barrier synthetic resin is incorporated in the laminated structure as an inner barrier layer.

A wide variety of extrudable barrier resins may be employed as the inner barrier layer in accordance with the present invention. Particularly suited as gas barrier layers are extrudable vinylidene chloride polymers and ethylene vinyl alcohol copolymers. The requirement for the inner barrier layer is that the material be laminated to another polymer layer and that the laminate have the desired gas barrier characteristics. Particularly advantageous and beneficial are extrudable compositions of vinylidene chloride polymers, wherein the polymers contain at least 70 weight percent vinylidene chloride, the remainder being one or more olefinically unsaturated monomers copolymerizable therewith such as vinyl chloride. Ethylene vinyl alcohol copolymers are derived from hydrolyzed ethylene vinyl acetate copolymers containing from 15 to 65 mole percent ethylene and 85 to 35 mole percent of vinyl acetate.

The inner gas barrier layer of the laminate structure may be from about 0.2 to about 3.5 about mils in thickness and is most advantageously from about 1.0 to about 2.5 mils thick. The inner gas barrier layer is adhered to the outer polyolefin layers by an adhesive layer which may vary in thickness from about 0.2 to about 0.4 mils, however, generally the preferred adhesive layer thickness is about 0.25 to about 0.35 mils. Ethylene vinyl acetate copolymers are typically used as adhesive layers.

In preparing the intermediate heat seal layer used in the practice of the present invention, the particulate filler comprises about 30 to about 50 percent by weight of the layer composition and preferably about 35 to about 45 percent by weight. Included in the olefin polymer blend used to prepare the intermediate heat seal layer composition is 20 to about 45 percent by weight of an olefin homopolymer such as polyethylene and polypropylene or a mixture thereof and preferably about 25 to about 40 percent by weight of the olefin homopolymer about 20 to about 50 percent by weight of a highly crystalline propylene-ethylene block copolymer and about 1 to about 10 percent by weight of an elastomeric ethylene-propylene rubber.

The term "highly crystalline" when used to describe the highly crystalline propylene-ethylene block copolymer means a propylene-ethylene copolymer that is insoluble in hexane and heptane. Highly crystalline propylene-ethylene block copolymers are known to the art and are available commercially. For example polyallomers sold under the Trademark Tenite by Eastman Chemical Products, Inc., Kingsport, Tenn. is a random block copolymer of propylene and ethylene which exhibits a degree of crystallinity normally associated with homopolymers. The insolubility of the polyallomer in hexane and heptane establishes that the polyallomer is a highly crystalline material. Infrared spectra indicate that polyallomer chains comprise polymerized segments of each of the monomers employed. These segments exhibit crystallinities associated only with homopolymers of these monomers.

The term "elastomeric ethylene-propylene copolymer" means amorphous ethylene-propylene rubbers widely available on the commercial market.

The particulate filler incorporated in the intermediate heat seal layer has preferably laminated structure and is used in a finely divided form, a particle size in the order of 0.1 to 10.0 microns being preferred. Suitable filler materials include silica, talc and mica, with talc being preferred.

Various pigments and colorants may be incorporated in the heat seal layer compositions to impart color and/or opacity. Pigments and colorants such as titanium dioxide may be included in the compositions at concentrations ranging from about 1 to about 10 percent by weight of the composition.

In the preparation of packaging containers of the present invention, the intermediate heat seal layer can be applied in the form of a thin strip to the lid or container flange or may be a dispersion which can be applied to either the lid surface containing a heat activatable layer or the flange surface of the container. Preferably the intermediate heat seal layer is coextruded as a layer of about 2 to about 10 mils thickness laminated to the polyolefin outer layer of the laminated sheet material from which the container is formed.

In heat sealing the lid to the container any suitable form of sealing ca be employed including ultrasonic sealing, induction heating or heat sealing jaws.

DESCRIPTION OF THE DRAWINGS

In the drawings which are attached hereto and made a part of this specification:

As shown in FIGS. 1 and 2 of the drawings the present invention is embodied very generally in a package 10 having an individual laminated container or cup 11 with a central chamber 12 and an outwardly turned horizontal flange 12a to which is heat sealed lid 13.

In FIG. 3, a partial section of the package 10 is shown wherein the container 11 is molded from a multi-layer film structure. Lid 13 hermetically seals the container 11. A portion of the lid extends beyond the flange 12a to form a gripping tab area 13a so that the tab can be gripped between the fingers and peeled away from the flange to open the package.

Figure 1:
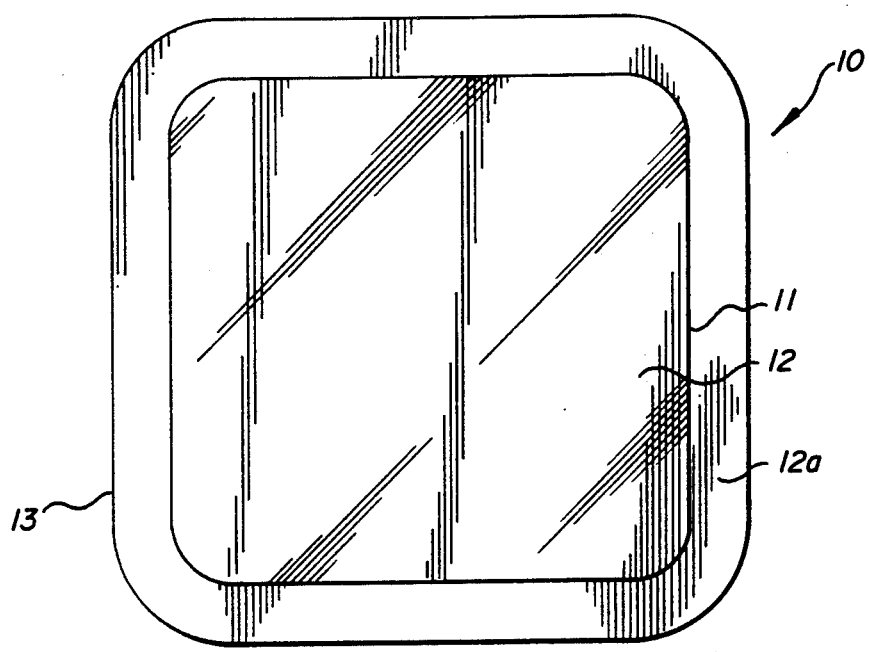
FIG. 1 is a top plan view of a package of the type that may advantageously be sealed according to the present invention.
Figure 2:
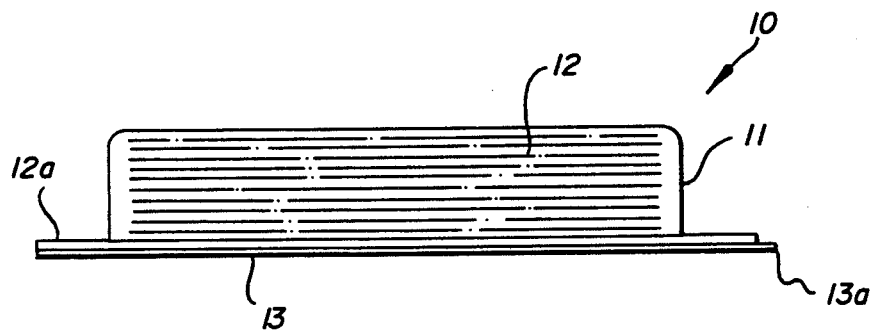
FIG. 2 is a side elevation of the package shown in FIG. 1.
Figure 3:
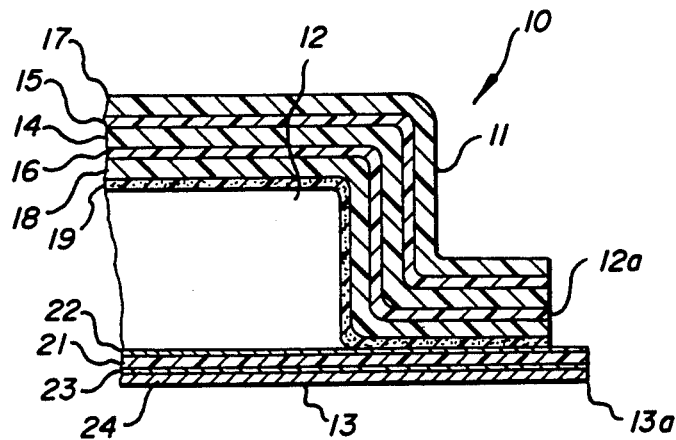
FIG. 3 is a partial section in exaggerated detail showing the various layers of the laminated container structure a well as the surfaces sealed according to the present invention.

The laminated structure of the container 11 is comprised of inner gas barrier core layer 14, thermoplastic adhesive layers 15, 16 juxtaposed on each side of the barrier layer 14, outer polyolefin, e.g., polypropylene, layers 17 and 18 secured to each of the adhesive layers 15 and 16, and a continuous coherent heat seal layer 19 comprised of the olefin polymer blend and particulate filler of the present invention, the heat seal layer being bonded to the polyolefin outer layer 18, which forms the interior, food contact surface of the container 11.

The total thickness of the multilayered structure from which the container 11 is molded ranges in thickness from about 10 to about 200 mils thickness and preferably about 10 to about 40 mils thickness. The heat seal layer 19 can be about 1 to 10 mils thick, the outer polyolefin layers 17, 18 about 10 to 60 mils thick, the gas barrier layer 14 about 0.2 to about 0.35 mils thick and the adhesive layers 15, 16 about 0.25 mils thick.

Heat sealed to the container 11 through the intermediate, peelable heat seal layer 19 is lid 13 comprising an aluminum foil layer 21, inner and outer heat activatable thermoplastic adhesive layers 22 and 23 juxtaposed on each side of the aluminum foil layer 21 and a polyolefin layer 24 bonded to the outer adhesive layer 23. The total thickness of lid ranges from about 15 to about 40 mils thickness and preferably about 10 to about 30 mils thickness. The aluminum foil layer 21 can be about 1 to about 5 mils thick, the inner and outer adhesive layers 21 and 22 about 0.1 to about 0.5 mils thick and the other polyolefin layer about 25-30 mils thick.

To hermetically seal the container 11, the lid 13 is placed over the exposed heat seal layer 19 on the flange 12a of the container 11, and heat and pressure are applied by the platens of a heat sealing device such as an induction heater, to form a hermetic seal. During the heat sealing operation, the heat seal layer 19 is bonded to the heat activatable surface layer 22 of the lid 13. The sealed container is sufficiently rigid to maintain its shape during normal handling.

Although the heat sealing operation results in an hermetically sealed container, the lid 13, even after exposure to thermal processing, can be readily and smoothly separated by hand without tearing of either the lid 13 or the flange 12a by grasping the lid 13 by tab 13a and peeling it off the flange. The heat seal layer 19 in the area of the heat seal is reduced in thickness as the lid 13 is peeled from the flange 12a, as a portion of the heat seal layer 19 is separated and removed from the flange surface as the lid 13 is peeled back. This ease of separation is obtained because the cohesive strength of the heat seal layer 19 is considerably less than the tensile strength of the bond between the surface of the heat seal layer 19 and the surface of the heat activatable layer 22 of the lid 13. Examination of the parted lid surface indicates a continuous bead of heat seal material 19 adhered to the heat activatable underside layer 22 of the lid 13.

In the manner described above polyolefin containers are obtained which, although hermetically sealed, are easily peelable to open by hand by the user without recourse to scissors or other tools. The sealed containers although peelably openable may be retorted without premature opening, do not accidently open when dropped from a height two feet or more and do not accidently open when subjected to the normal mechanical abuse encountered during transportation and storage.

The invention is illustrated by the following Example:

EXAMPLE

A laminated sheet was prepared by coextrusion of a first heat sealable layer composed of a mixture of 20 percent by weight polypropylene, 5 percent by weight high density polyethylene, 5 percent by weight of an ethylene-Propylene rubber, 25 percent by weight of a polyallomer which wa a Propylene-ethylene block copolymer sold by Eastman Chemical Products under the trademark Tenite Polyallomer, 40 percent by weight of talc having a particle size of 5 microns and 5% $TiO_2$ having a particle size of 1 micron. The heat seal layer was bonded to one of the two outer layers of the sheet which were composed of propropylene. An inner barrier layer composed of 82 weight percent vinylidene chloride and 18 weight percent vinyl chloride was interposed between the outer polypropylen layers and bonded thereto by adhesive layers comprised of a mixture of an ethylene-vinyl acetate copolymer and polymethyl methacrylate. The heat seal layer was about 5 mils thick. The outer layers were 20 mils thick, the inner gas barrier layer was 2.2 mils thick and the adhesive layers were each 0.25 mil thick. The individual layers were coextruded from a conventional extruder through a flat sheet die, the melt streams being combined in a coextrusion block prior to being extruded from the die.

The multilayer coextrudate was thermoformed into 6.5"×5.0"×1.0" trays, with the heat seal layer forming the food contact side of the tray, using conventional thermoforming equipment.

A complementary lid was prepared by coating opposite surfaces of a 1.5 mil thick film of aluminum foil with a 0.2 mil thick coating of Morprime, a commercially available adhesive promoting dispersion containing a maleic anhydride modified polypropylene. After application of the Morprime, the coated aluminum foil was baked at 180° C. to volatilize the solvent and fused to coolesce the dispersed particles into a continuous film. Thereafter, a 23 mil thick film of $TiO_2$ pigmented polypropylene was extrusion coated on one side of the Morprime coated aluminum foil, and a 2 mil thick film of polypropylene coated on the other side.

The lid was used to hermetically seal the thermoformed trays filled with water by induction heat sealing the polypropylene coated surface of the lid to the flanged surface of the trays. The lid container assembly was placed between the jaws of an induction sealer and heat sealed at 300° C., 60 psi for 0.3 seconds using a TOCCO 50 KW/10 KHz induction heater.

1.0 inch strips were cut frm the lid and induction heat sealed to a similar sized strip cut from the laminated sheet from which the container was thermoformed. The T-Peel value, i.e., the force required to separate the heat sealed layers, was measured on an Instron tensile tester which applied a constant strain rate of 2.0 inches per minute on the assembly. The T-Peel was found to be 5.0 lbs/in.

The heat sealed water filled trays were subjected to retort processing at 250° F. for 0.5 hours with 0.5 hours required for the retort to reach the 250° F. temperature. When it was attempted to separate the heat sealed lid from the retorted container flange, the lid was easily peelable from the container by hand. Examination of the lid and flange surfaces which had been heat sealed together and subjected to retorting indicated that a portion of the heat sealing layer had been removed with the lid and a portion of the heat seal layer remained on the flange surface indicating that there had been cohesive failure in the heat seal layer.

The ability of the heat sealed container retorted to withstand mechanical abuse was determined in accordance with the following United States Department of Agriculture standardized mechanical abuse tests.

1. Vibration Testing

The sealed container is subjected to vibration on a test apparatus designed to simulate, over a short time period, vibrations which may be encountered by the packages in normal shipping operations. In this test the packages were vibrated for 30 minutes in a vibrator at about 200 cycles per minute.

2. Drop Test (ASTM D775-61)

After vibration testing in accordance with ASTM D999-TS the sealed containers filled with 10 ounces of water must survive drops from a height of at least 28 inches onto a hard surface so that the so-called 2-3-5 corner is impacted, dropped again so that the 3-5 edge is impacted, and dropped three more times so that the 5 end, the 2-side and the 3 bottom are in turn, all impacted.

No leaks were detected even after the containers were dropped from a height of 63 inches.

The procedure of the Example was repeated with the exception that the container was cooled to a temperature of 42° F. before being subjected to the Drop Test. The cooled heat sealed container was also able to withstand a drop of 63 inches.

What is claimed is:

1. A package comprised of a container formed from a structure having a sealing surface formed from a polypropylene resin, the container having a complementary lid, the lid having a contact face and extending across an opening in the container in contact with the sealing surface, the contact face of the lid and sealing surface being opposed and bonded together by an internally cleavable heat seal layer intermediate between the opposed lid contact face and sealing surface, the heat seal layer being comprised of about 30 to about 50 percent by weight of a particulate filler and an olefin polymer blend including about 20 to about 45 percent by weight of an olefin homopolymer about 20 to about 50 percent by weight of a highly crystalline propylene-ethylene block copolymer and about 1 to about 20 percent by weight of an elastomeric ethylene-propylene rubber.

2. The package of claim 1 wherein the olefin homopolymer is polypropylene.

3. The package of claim 1 wherein the olefin homopolymer is polyethylene.

4. The package of claim 1 wherein the highly crystalline propylene-ethylene block copolymer is a propylene-ethylene polyallomer.

5. The package of claim 1 wherein the particulate filler is talc.

6. The package of claim 1 wherein the container is formed from a laminated sheet structure.

7. The package of claim 6 wherein the laminated sheet structure is provided with an inner gas barrier layer interposed between the outer polypropylene layers.

8. The package of claim 7 wherein the inner gas barrier layer is formed from a vinylidene chloride polymer.

9. The package of claim 1 wherein the heat seal layer is an integral part of the container.

10. A method of making a package comprised of a container part heat sealed with a lid having a contact face, the container part having a contact face formed from a polypropylene resin, the contact face of the lid and container part being placed in opposed relation to be hermetically heat sealed together, which method comprises applying to at least one of the opposed faces a heat sealable layer in which the cohesive strength of the heat seal layer is less than the tensile strength of the heat seal layer so that the layer cleaves within itself when forces are applied to the parts to pull them apart, the heat seal layer being comprised of a mixture of about 30 to about 50 percent by weight of a particulate filler and an olefin polymer blend including a mixture of about 20 to about 45 percent by weight of an olefin homopolymer, about 20 to about 50 percent by weight of a highly crystalline propylene-ethylene block copolymer and about 1 to about 20 percent by weight of an elastomeric ethylene-propylene rubber.

11. The method of claim 10 wherein the olefin homopolymer is polypropylene.

12. The method of claim 10 wherein the olefin homopolymer is polyethylene.

13. The method of claim 10 wherein the highly crystalline propylene-ethylene block copolymer is a propylene-ethylene polyallomer.

14. The method of claim 10 wherein the particulate filler is talc.

15. The method of claim 10 wherein the container is formed from a laminated sheet structure.

16. The method of claim 15 wherein the laminated sheet structure has an inner gas barrier layer interposed between the outer polypropylene layers.

17. The method of claim 16 wherein the inner gas barrier layer is formed from a vinylidene chloride polymer.

18. The method of claim 10 wherein the heat seal layer is an integral part of the container.

* * * * *